July 12, 1932.  F. B. VON KLEIST  1,867,291

MERCURY ARC RECTIFIER

Filed May 31, 1930   2 Sheets-Sheet 1

INVENTOR
Felix Baron von Kleist.
BY
Wesley Sloan
ATTORNEY

July 12, 1932. F. B. VON KLEIST 1,867,291
MERCURY ARC RECTIFIER
Filed May 31, 1930   2 Sheets-Sheet 2

INVENTOR
Felix Baron von Kleist.
BY
Wesley G. Carr
ATTORNEY

Patented July 12, 1932

1,867,291

UNITED STATES PATENT OFFICE

FELIX BARON VON KLEIST, OF BERLIN-SIEMENSSTADT, GERMANY, ASSIGNOR TO WESTINGHOUSE ELECTRIC & MANUFACTURING COMPANY, A CORPORATION OF PENNSYLVANIA

MERCURY-ARC RECTIFIER

Application filed May 31, 1930, Serial No. 458,038, and in Germany June 3, 1929.

My invention relates to a mercury-arc rectifier and particularly to current dividers for use with such rectifiers.

It is an object of my invention to provide a current distributor that will maintain an even flow of current through each of the several anodes of a mercury-arc rectifier.

It is a further object of my invention to provide a current distributor that shall be compact and may be assembled as an integral unit with the transformer supplying energy to the rectifier.

Other objects and advantages of my invention will be apparent from the following detailed description, taken in connection with the accompanying drawings, in which.

Figure 1:
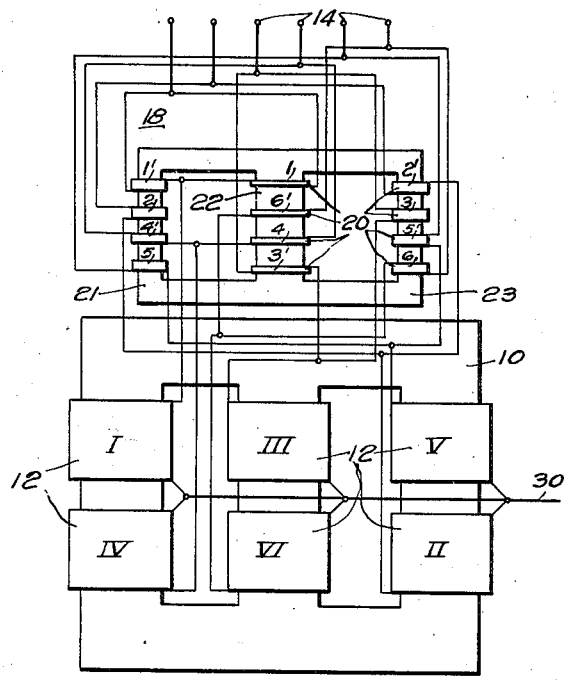
Figure 1 is a diagrammatic elevation of apparatus embodying my invention.

The apparatus disclosed in the drawings comprises a supply transformer having a three-leg core 10 on which is wound the coils 12 of a six-phase secondary diametrical winding, the primary windings being omitted for the sake of simplicity, and the secondary windings 12 being designated I, II, III, IV, V and VI to denote phase relations. Associated with each of the six-phase windings 12 is an anode 14 in the rectifier tank 15.

In the modification shown in Fig. 1, my balancing or distributing device 18 is connected between the terminals of the secondary windings 12 and the anodes 14.

My distributor 18 comprises a balancing or distributing coil 20 for each of the secondary phases I to VI of the supply transformer.
Each distributor coil 20 comprises two parallel portions designated 1, 1'; 2, 2'; 3, 3'; 4, 4'; 5, 5'; 6, 6'; to denote the phase to which it is attached, these parallel portions being disposed on separate legs 21, 22 and 23 of a three-leg distributor core. One of the parallel coil portions, as 1', is on a core-leg 21 on which is also placed a coil-portion, as 2, of the next preceding phase winding, and the other parallel coil-portions, as 1, is on a core-leg 22 with one of the coil-portions, as 6'; connected to the next succeeding phase winding. This is most clearly shown in Figs. 3 to 5. The coil-portions 1 to 6' are so connected that when equal currents are flowing in the coil-portions on the same leg 21, 22 or 23, there will be no resultant flux set up in that leg. This magnetic inter-linkage between the coil-portions maintains an equal current in the coil-portions and distributes the currents from the main secondary phase windings 12 equally among the active anodes.

In order to produce a compact and simple device, I place the coil-portions from diametrically opposite main phase windings, as I and IV, on the same pair of legs, as 21 and 22, of the distributor 18. This places four coil-portions on each of the legs 21, 22 and 23 of the distributor core, two of the coil-portions being diametrically opposed, which is feasible, as only the phase that is positive at any given instant is carrying current.

Figure 2:
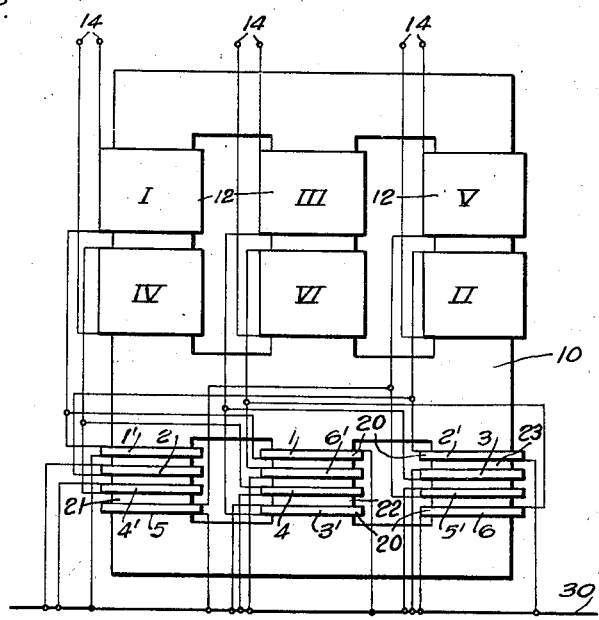
Fig. 2 is a similar view of a modification in which my current divider is mounted on a core integral with the supply transformer.

The modification shown in Fig. 2 is substantially identical with the modification shown in Fig. 1, except that the balancer coils 20 are connected between the phase windings 12 and the neutral 30. This connection allows the use of a low-tension balancer winding. Also, it is better adapted for unitary installation in the tank with the transformer, in that all the connections are made directly on the coils and only the anode leads and the return neutral 30 need be brought out of the transformer tank.

Figure 3:
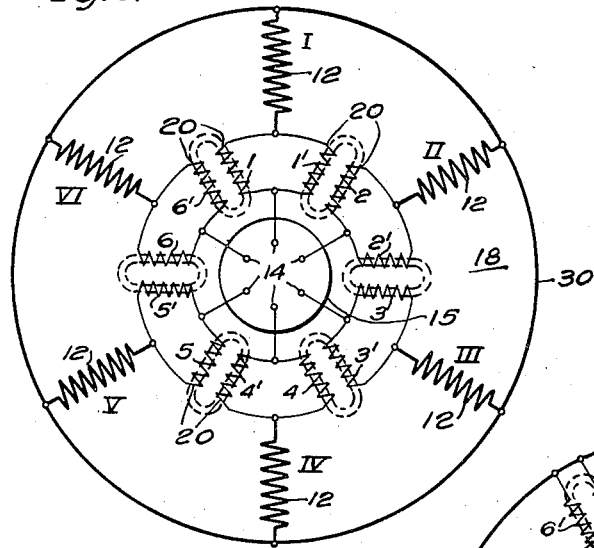
Fig. 3 is a schematic diagram of the connections shown in Fig. 1.
Figure 4:
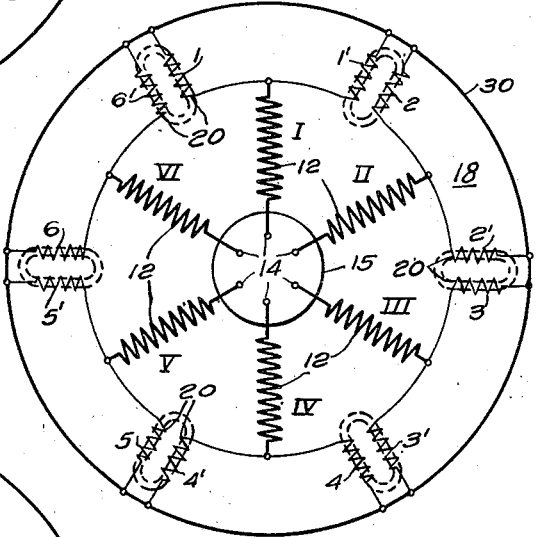
Fig. 4 is a similar schematic of the modification shown in Fig. 2.
Figure 5:
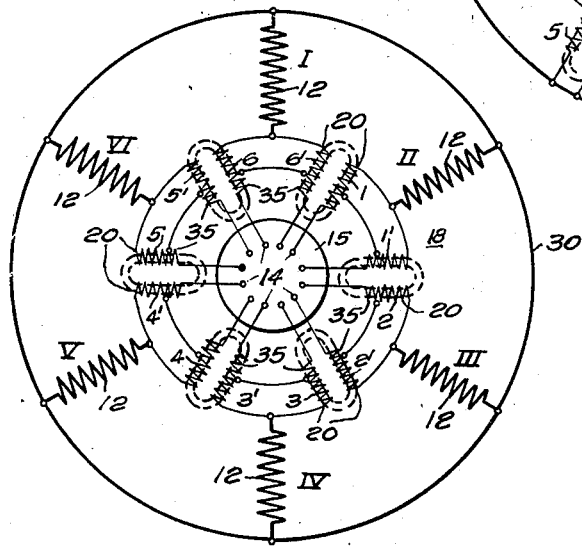
Fig. 5 is a similar view of a further modification of the apparatus shown in Fig. 1.

In the arrangement according to Figs. 1, 3 and 5 the current distributor may either be built in the tank of the main transformer or may be disposed outside of the same.

For the sake of obtaining a proper field flux distribution, it is preferred to combine the three similar phase fields of the third harmonics in the current distributor 18 in such manner that the middle leg 22 of the distributor core carries a third-harmonic flux twice as large as the side legs. In order that the third-harmonic voltages in all of the coil-portions 1 to 6' may be the same, the number of turns on the coil-portions 1, 6', 4 and 3', the middle leg 22 must be only one half as great, therefore, as on the side legs 21 and 23, and the connections are such that the middle leg 22 provides a return flux-path for the third harmonic fluxes in the two side legs 21 and 23. While it is possible to make one of the side legs carry the double field, it is not desirable, as the symmetry of the distributor would be disturbed. In order to maintain as equal flux density in all of the legs of the distributor core 18 I preferably make the cross sectional area of the middle leg equal to the cross sectional area of the other two.

The modification shown in Fig. 5 differs from the modification shown in Fig. 1, in that two anodes 14 are used to carry the current of each phase, and an auxiliary reactor 35 is employed to divide the current between the two parallel anodes of each phase. For purposes of convenience, the reactor coils 35 are divided and made a continuation of the parallel coil-portions 20 of the distributor system 18.

The operation of my device is as follows: Assuming that the current in phase winding I is positive and maximum at a given instant and that the phase rotation is clockwise. Under these conditions, the current in phase winding I will be maximum, and the anode 14 associated with this winding, will be carrying maximum current. At this instant, the voltage and current in phase VI will have passed its maximum, and the voltage and current in phase II will not yet have reached a maximum. The current still flowing in the diminishing or preceding phase VI will flow through the half of the parallel winding 20 which is inter-linked with the parallel winding of phase I, and the currents in these interlinked coils will be equal. Consequently, as the current in phase VI decreases, the current in the parallel coil connected to phase I decreases, and the current increases in that half of the parallel winding which is interlinked with phase II. Consequently, at the moment when the current in phase I is a maximum, the two parallel coils of the distributor connected to phase I will be carrying equal currents, and phase VI and II will be carrying each one half the current carried by phase I. However, as the current in phase I passes a maximum, the current will be shifted to interlink only with the parallel coil of phase II, and the current will rapidly die out of phase VI. In this manner, the various anodes will receive current for equal periods of time, and the currents are so interlinked with the succeeding and preceding phases that the current will be properly transferred from one anode to another.

I do not desire to restrict myself to the specific embodiments of my invention herein shown and described, since it is evident that changes and modifications may be made without departing from the spirit and scope of my invention as defined in the appended claims.

I claim as my invention:

1. A current divider for a polyphase vapor-electric rectifier comprising a transformer having a six-phase sceondary, a rectifier anode associated with each secondary phase, a distributor winding associated with each secondary winding, said distributor winding comprising a plurality of coils arranged in parallel, a distributor core having three legs, said parallel coils being on separate legs of said distributor core.

2. A current divider for a polyphase vapor-electric rectifier comprising a transformer having a six-phase secondary, a rectifier anode associated with each secondary phase, a distributor winding associated with each secondary winding, said distributor winding comprising a plurality of coils arranged in parallel, a distributor core having three legs, said parallel coils being on separate legs of said distributor core, said parallel coils being interlinked, respectively, with a coil of the preceding and succeeding phase windings.

3. A current divider for a polyphase vapor-electric rectifier comprising a transformer having a six-phase secondary, a rectifier anode associated with each secondary phase, a distributor winding associated with each secondary winding, said distributor winding comprising a plurality of coils arranged in parallel, a distributor core having three legs, said parallel coils being on separate legs of said distributor core, said parallel coils being interlinked, respectively, with a coil of the preceding and succeeding phase winding, and the distributor coils of diametrically opposite phase windings being on the same distributor legs.

4. A current divider for a polyphase vapor-electric rectifier comprising a phase transformer having a six-phase secondary winding, a split balancing coil connected to each of said windings, a distributor core having three legs, the two portions of said split coil being on separate legs of said distributor core, a portion of said split coil being magnetically interlinked with a portion of the coil of the succeeding and the preceding phase coil.

5. A current distributor for a polyphase vapor-electric device comprising a six-phase supply and at least one anode connection for each phase, a distributor comprising a core having three legs, one of said legs being of the same cross sectional area as both the other two, a two-part balancing coil connected to each phase, the two parts being connected in parallel and being on different legs of said core and said part coils being respectively on the same leg as a part coil of the preceding and the succeeding phase and the coils of opposite phases occupying similar positions on said core.

6. In combination with a mercury-arc rectifier, a current equalizer comprising a transformer having a six-phase secondary having a common neutral to provide a return for a direct-current system to be supplied by said rectifier, at least one anode being associated with each phase, a current distributor comprising a core having three legs, and four windings on each of said legs, said windings comprising parallel coils of a split balancing coil connected to each phase of the transformer.

7. A rectifier system comprising the combination, with a transformer having star-connected six-phase secondary windings and a multi-anode mercury-arc rectifier connected thereto, of two parallel-connected distributor coils connected in series with each of the six secondary phase windings, characterized by the fact that the twelve distributor coils are mounted on a multi-legged transformer core with a coil of one phase mounted on one leg and balanced against an equal-sized oppositely connected coil in the next lagging phase, and with the other coil of the first phase mounted on another leg and balanced against an equal-sized oppositely connected coil in the next leading phase.

8. A rectifier system comprising the combination, with a transformer having star connected six-phase secondary windings and a multi-anode mercury-arc rectifier connected thereto, of two parallel-connected distributor coils connected in series with each of the six secondary phase windings, characterized by the fact that the twelve distributor coils are mounted on a three-legged transformer core with a coil of one phase mounted on one leg and balanced against an equal-sized oppositely connected coil in the next lagging phase, and with the other coil of the first phase mounted on another leg and balanced against an equal-sized oppositely connected coil in the next leading phase, and further characterized by the fact that the coils on the two outside legs are so wound that the third-harmonic fluxes are traveling upward at the same moment and return through the central leg, the coils on the central leg having one-half the number of turns of the coils on the two outer legs.

9. A rectifier system comprising the combination, with a transformer having star-connected six-phase secondary windings and a multi-anode mercury-arc rectifier connected thereto, of two parallel-connected distributor coils connected in series with each of the secondary phase windings, characterized by the fact that the twelve distributor coils are mounted on a three-legged transformer core, four coils to a leg, with a coil of one phase mounted on one leg and balanced against an equal-sized oppositely connected coil in the next lagging phase, and with the other coil of the first phase mounted on another leg and balanced against an equal-sized oppositely connected coil in the next leading phase, and further characterized by the fact that the coils on the two outside legs are so wound that the third-harmonic fluxes are traveling upward at the same moment and return through the central leg, the coils on the central leg having one-half the number of turns of the coils on the two outer legs.

10. The invention as defined in claim 9, characterized by the fact that the distributor coils are connected in the star connections of the transformer secondary windings.

11. The invention as defined in claim 9, characterized by the fact that the rectifier has at least twelve anodes connected with two parallel anodes to each phase of the secondary windings, with balance coils between the two parallel anodes of each phase, said balance coils being mounted on the legs of the distributor core.

In testimony whereof, I have hereunto subscribed my name this 8th day of May, 1930.

FELIX BARON von KLEIST.